(12) United States Patent
Zhang et al.

(10) Patent No.: US 12,101,505 B2
(45) Date of Patent: Sep. 24, 2024

(54) FAST RECOLOR FOR VIDEO BASED POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US); Weiwei Feng, Mountain View, CA (US); Bing Jian, Cupertino, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/500,345

(22) Filed: Oct. 13, 2021

(65) Prior Publication Data
US 2022/0394295 A1  Dec. 8, 2022

Related U.S. Application Data

(60) Provisional application No. 63/197,184, filed on Jun. 4, 2021.

(51) Int. Cl.
*H04N 19/597* (2014.01)
*H04N 19/186* (2014.01)

(52) U.S. Cl.
CPC ......... *H04N 19/597* (2014.11); *H04N 19/186* (2014.11)

(58) Field of Classification Search
CPC .................................................. H04N 19/597
See application file for complete search history.

(56) References Cited

U.S. PATENT DOCUMENTS

2003/0038798 A1   2/2003   Besl et al.
2019/0156518 A1*  5/2019   Mammou ............. G06T 7/0002
(Continued)

FOREIGN PATENT DOCUMENTS

EP   2 154 901 A1   2/2010
JP   2008-283662 A   11/2008

OTHER PUBLICATIONS

WG 7, MPEG 3D Graphics Coding, "V-PCC Codec Description", ISO/IEC JTC 1/SC 29/WG 7, N00012, MPEG 3D Graphics Coding Convenorship: AFNOR (France), International Organization for Standardization, Oct. 2020 (73 pages total).

(Continued)

*Primary Examiner* — Chikaodili E Anyikire
*Assistant Examiner* — Shanika M Brumfield
(74) *Attorney, Agent, or Firm* — Sughrue Mion, PLLC

(57) ABSTRACT

Methods and apparatuses of encoding a video stream using video point cloud coding include obtaining a source point cloud; obtaining a geometry-reconstructed point cloud, wherein the geometry-reconstructed point cloud is reconstructed using lossy coding; obtaining a target point included in the geometry-reconstructed point cloud; performing at least one of a forward K-dimensional (KD)-tree search to determine a first plurality of points of the source point cloud which are nearest neighbors to the target point, and a backward KD-tree search to determine a second plurality of points of the source point cloud for which the target point is a nearest neighbor; determining an average color value based on at least one of a first average color value of the first plurality of points and a second average color value of the second plurality of points; selecting a color value for the target point based on the average color value; and generating an encoded video stream based on the selected color value.

20 Claims, 9 Drawing Sheets

(56) References Cited

U.S. PATENT DOCUMENTS

| | | | |
|---|---|---|---|
| 2020/0020133 A1* | 1/2020 | Najaf-Zadeh | G06T 3/40 |
| 2020/0279404 A1 | 9/2020 | Vosoughi et al. | |
| 2020/0296401 A1* | 9/2020 | Lee | G06T 3/4023 |
| 2020/0314435 A1 | 10/2020 | Tourapis et al. | |
| 2021/0005006 A1 | 1/2021 | Oh | |
| 2021/0056730 A1* | 2/2021 | Ricard | H04N 19/184 |
| 2021/0104090 A1* | 4/2021 | Hur | H04N 19/597 |
| 2021/0166436 A1 | 6/2021 | Zhang et al. | |
| 2021/0209809 A1* | 7/2021 | Najaf-Zadeh | H04N 19/597 |
| 2022/0170737 A1* | 6/2022 | Kaabi | G01S 7/4813 |

OTHER PUBLICATIONS

Rufael Mekuria et al., "Requirements for Point Cloud Compression", International Organisationn for Standardization, ISO/IEC JTC1/SC29/WG11, Coding of Moving Pictures and Audio, ISO/IEC JTC1/SC29/WG11 MPEG2016/n16330, Feb. 2016, Geneva, CH (3 pages total).

Tulvan et al., "Use Cases for Point Cloud Compression (PCC)", International Organisation for Standardisation, ISO/IEC JTC1/SC29/WG11, Coding of Moving Pictures and Audio, ISO/IEC JTC1/SC29/WG11 MPEG2015/ N16331, Jun. 2016, Geneva, CH (8 pages total).

International Search Report dated Jan. 24, 2022 in Application No. PCT/US 21/55041.

Written Opinion of the International Searching Authority dated Jan. 24, 2022 in Application No. PCT/US 21/55041.

Extended European Search Report issued Sep. 8, 2023 in European Application No. 21938139.9.

Arash Vosoughi et al., "[V-PCC] [New proposal] Distance-weighted color transfer", International Organisation for Standardisation Organisation Internationale De Normalisation ISO/IEC JTC1/SC29/WG11 Coding of Moving Pictures and Audio, ISO/IEC JTC1/SC29/WG11 MPEG2018/m47800, Mar. 2019, Geneva, Switzerland (5 pages).

Satoru Kuma et al., "PCC CE1.3 Recolor method", International Organisation for Standardisation Organisation Internationale De Normalisation ISO/IEC JTC1/SC29/WG11 Coding of Moving Pictures and Audio, ISO/IEC JTC1/SC29/WG11 MPEG2017/M42141, Jan. 2018, Gwangju, KR (7 pages).

Japanese Office Action dated Jan. 9, 2024 in Application No. 2022-568640.

* cited by examiner

FAST RECOLOR FOR VIDEO BASED POINT CLOUD CODING

CROSS-REFERENCE TO RELATED APPLICATION

This application claims priority from U.S. Provisional Application No. 63/197,184, filed on Jun. 4, 2021, the disclosure of which is incorporated herein by reference in its entirety.

FIELD

This disclosure is directed to a set of advanced video coding technologies, more specifically, video based point cloud compression including fast recolor color transfer.

BACKGROUND

Advanced three-dimensional (3D) representations of the world are enabling more immersive forms of interaction and communication. They also allow machines to understand, interpret, and navigate our world. Point clouds have been widely used as a 3D representation of the world. For example, they may be used in autonomous driving vehicles for object detection and localization; in geographic information systems (GIS) for mapping, and in cultural heritage to visualize and archive cultural heritage objects and collections, etc. Several use cases associated with point cloud data have been identified, and some corresponding requirements for point cloud representation and compression have been developed.

Point clouds contain a set of high dimensional points, for example three dimensional (3D), each including 3D position information and additional attributes such as color, reflectance, etc. They can be captured using multiple cameras and depth sensors, or Lidar in various setups, and may be made up of thousands up to billions of points to realistically represent the original scenes.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic cloud.

SUMMARY

According to embodiments, a method of encoding a video stream using video point cloud coding, is performed by at least one processor includes obtaining a source point cloud; obtaining a geometry-reconstructed point cloud, wherein the geometry-reconstructed point cloud is reconstructed using lossy coding; obtaining a target point included in the geometry-reconstructed point cloud; performing at least one of a forward K-dimensional (KD)-tree search to determine a first plurality of points of the source point cloud which are nearest neighbors to the target point, and a backward KD-tree search to determine a second plurality of points of the source point cloud for which the target point is a nearest neighbor; determining an average color value based on at least one of a first average color value of the first plurality of points and a second average color value of the second plurality of points; selecting a color value for the target point based on the average color value; and generating an encoded video stream based on the selected color value.

According to embodiments, an apparatus for encoding a video stream using video point cloud coding includes at least one memory configured to store program code; and at least one processor configured to read the program code and operate as instructed by the program code, the program code including: first obtaining code configured to cause the at least one processor to obtain a source point cloud; second obtaining code configured to cause the at least one processor to obtain a geometry-reconstructed point cloud, wherein the geometry-reconstructed point cloud is reconstructed using lossy coding; third obtaining code configured to cause the at least one processor to obtain a target point included in the geometry-reconstructed point cloud; performing code configured to cause the at least one processor to perform at least one of a forward K-dimensional (KD)-tree search to determine a first plurality of points of the source point cloud which are nearest neighbors to the target point, and a backward KD-tree search to determine a second plurality of points of the source point cloud for which the target point is a nearest neighbor; determining code configured to cause the at least one processor to determine an average color value based on at least one of a first average color value of the first plurality of points and a second average color value of the second plurality of points; selecting code configured to cause the at least one processor to select a color value for the target point based on the average color value; and generating code configured to cause the at least one processor to generate an encoded video stream based on the selected color value.

According to embodiments, a non-transitory computer-readable medium storing computer instructions for encoding a video stream using video point cloud coding that, when executed by at least one processor, cause the at least one processor to: obtain a source point cloud; obtain a geometry-reconstructed point cloud, wherein the geometry-reconstructed point cloud is reconstructed using lossy coding; obtain a target point included in the geometry-reconstructed point cloud; perform at least one of a forward K-dimensional (KD)-tree search to determine a first plurality of points of the source point cloud which are nearest neighbors to the target point, and a backward KD-tree search to determine a second plurality of points of the source point cloud for which the target point is a nearest neighbor; determine an average color value based on at least one of a first average color value of the first plurality of points and a second average color value of the second plurality of points; select a color value for the target point based on the average color value; and generate an encoded video stream based on the selected color value.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

Embodiments of the present disclosure relate to an annealing iterative geometry smoothing to avoid over-smoothing in an iterative smoothing framework. Embodiments of the present disclosure relate to using a combination of average and median statistics to derive the reference points aiming to reduce the computational complexity of using the pure median.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
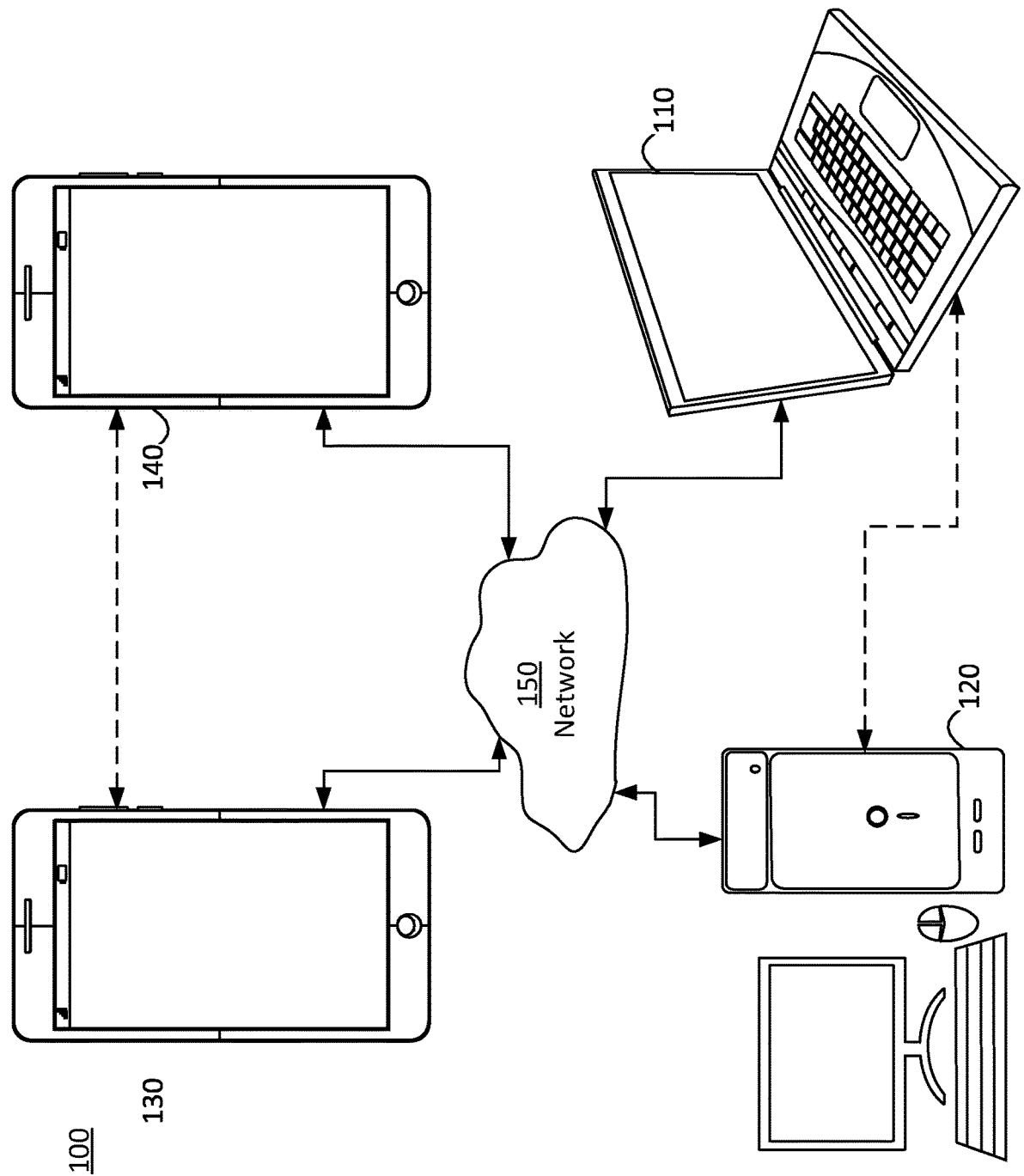
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
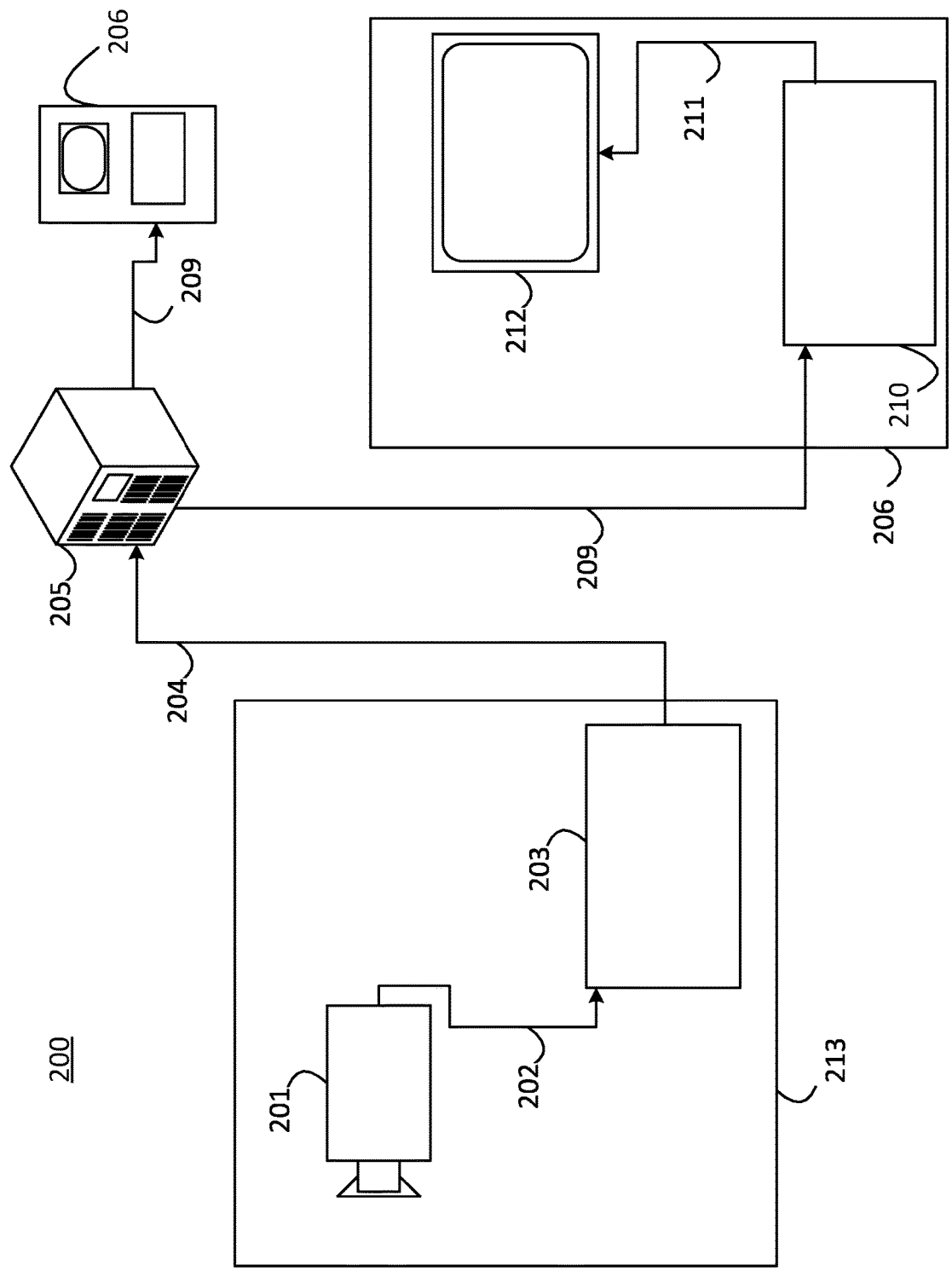
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
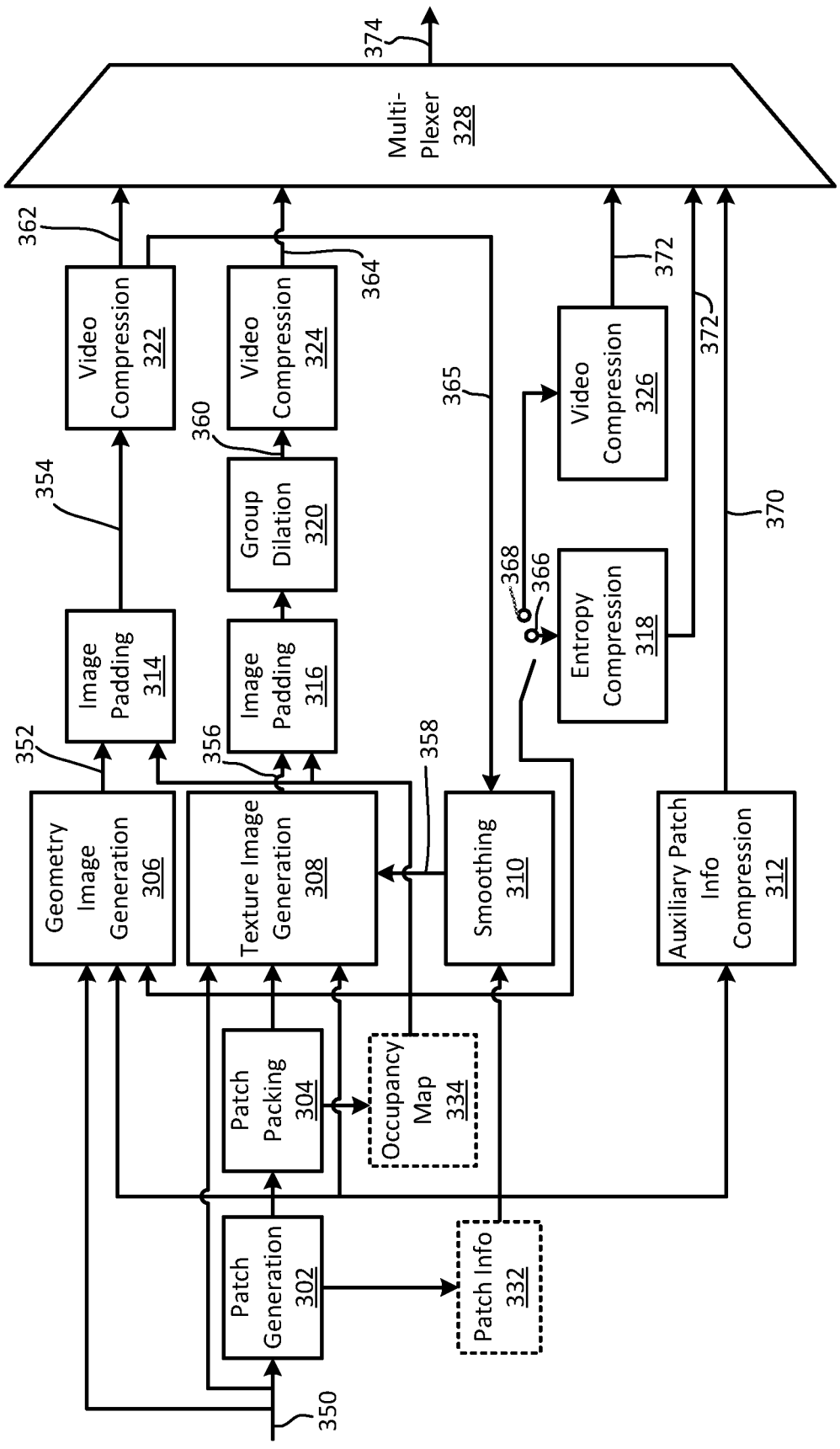
FIG. 3 is a schematic illustration of a simplified block diagram of a video encoder in accordance with an embodiment.
Figure 4:
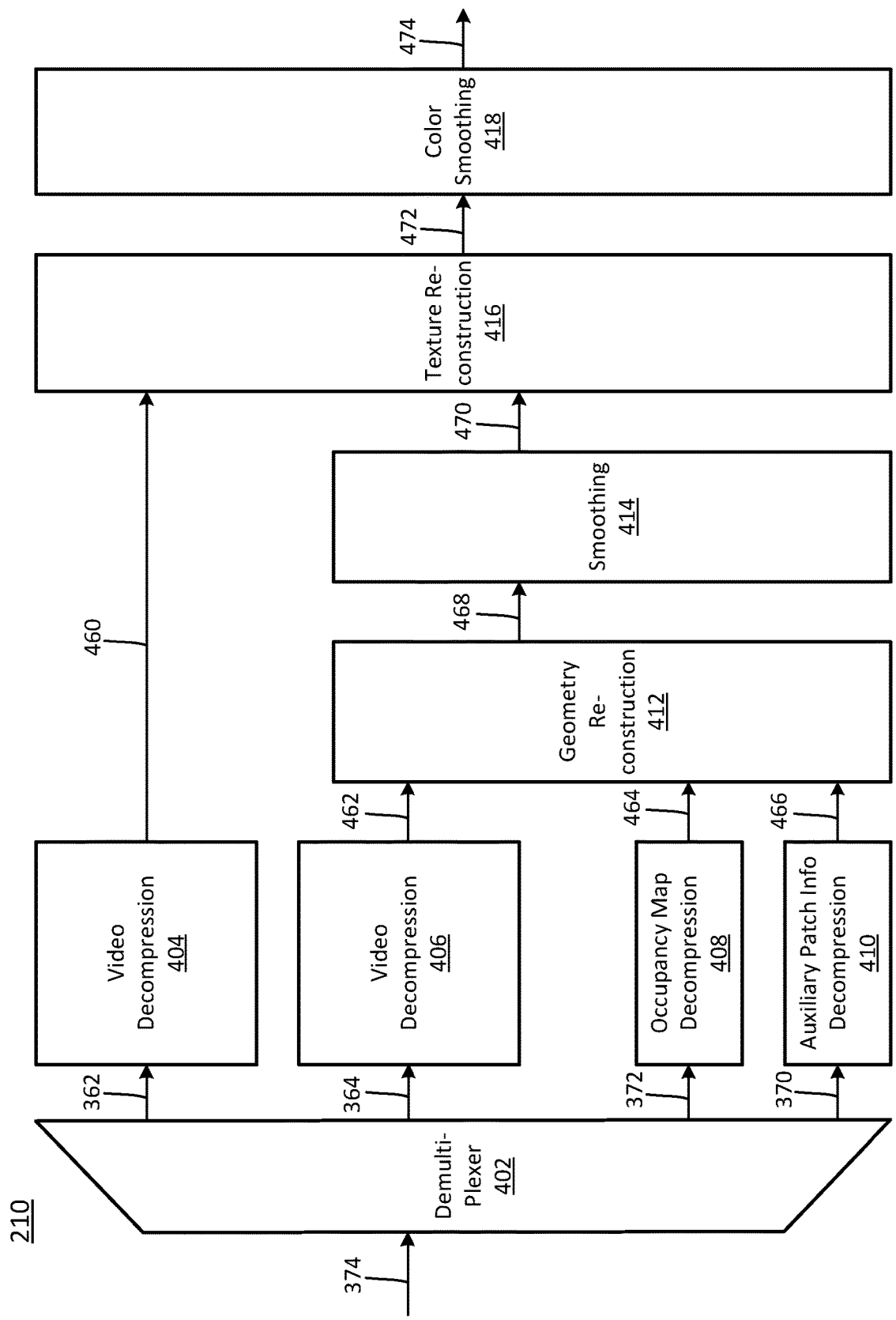
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid w % bile minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

Recoloring in Video-Based Point Cloud Compression (V-PCC)

In the MPEG PCC test model category 2 (TMC2) model, which may correspond to V-PCC, the recoloring process, which may be referred to as, color transferring, may be applied at the encoder-side when the geometry is lossy coded and duplicated positions are merged. An example of the recoloring algorithm is given below, with reference to FIGS. 5 and 6.

Figure 5:
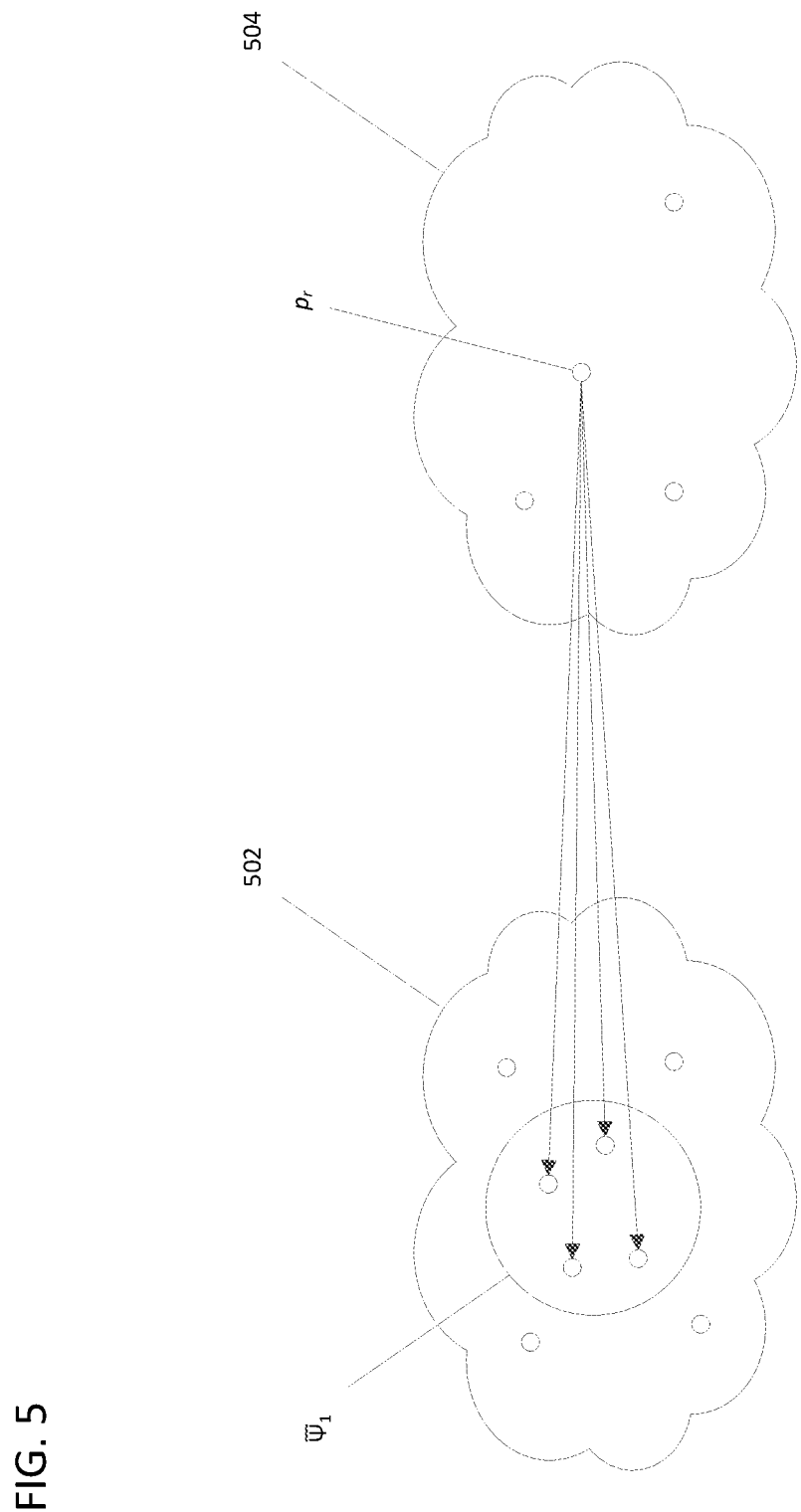
FIG. 5 illustrates an example of a forward search between a source point cloud and a reconstructed point cloud, in accordance with an embodiment.
Figure 6:
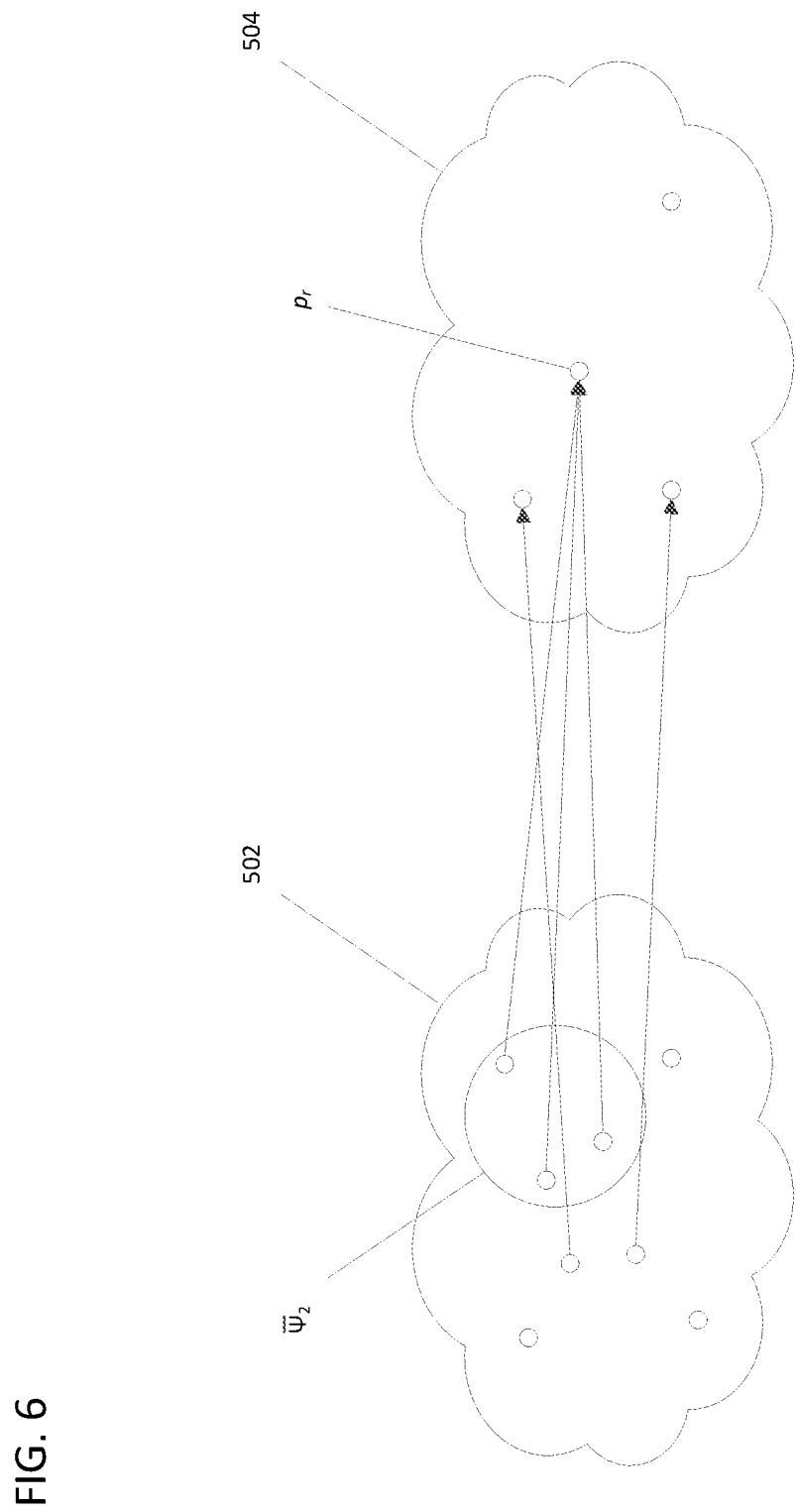
FIG. 6 illustrates an example of a backward search between a source point cloud and a reconstructed point cloud, in accordance with an embodiment.

Given source point cloud 502, attributes, and a target point $p_r$ included in reconstructed point cloud 504, the color transfer procedure, i.e., the recoloring process, may determine the attribute values of the reconstructed point cloud that minimize the attribute distortions. The approach can be implemented as follows:

For each target point $p_r$:
1—Find the $N_1$ ($1<N_1$) nearest neighbor points in source point cloud 502 to $p_r$ and create a set of points denoted by $\Psi_1$. This may correspond to a forward search as illustrated in FIG. 5.
2—Find the set of point in source point cloud 502 such that $p_r$ belongs to their set of $N_2$ nearest neighbor points in reconstructed point cloud 504. Denote this set of points by $\Psi_2$. This may correspond to a forward search as illustrated in FIG. 6.
3—Compute the distance-weighted average of points in $\Psi_1$ and $\Psi_2$ by:

$$\bar{\Psi}_k = \frac{\sum_{q \in \Psi_k} \frac{c(q)}{\Delta(q, p_r)}}{\sum_{q \in \Psi_k} \frac{1}{\Delta(q, p_r)}} \quad \text{Equation (1)}$$

where $\Delta(a,b)$ denotes the Euclidian distance between the points a and b, and $c(q)$ denotes the color of point q.
4—Compute the average (or the weighted average with the number of points of each set as the weights) of $\bar{\Psi}_1$ and $\bar{\Psi}_2$ and use it as a centroid color.
5—In some embodiments, a backward search from the centroid point may be used to exclude the points if their absolute differences to the centroid color is larger than the threshold $th_c$.
6—In some embodiments, the average (or the weighted average with the number of points of each set as the weights) of $\bar{\Psi}_1$ and $\bar{\Psi}_2$ may be updated and transferred to $p_r$.

In the current design of TMC2, the recoloring process may be rather complex because a K-dimensional (KD)-tree data structure is utilized in the nearest neighbor search and the recoloring operation is applied to every point in the reconstructed point cloud. Embodiments discussed below may reduce the complexity of the recoloring algorithm.

Embodiments disclosed herein may be used separately or combined in any order. Further, each of the embodiments, for example encoders and decoders, may be implemented by processing circuitry (e.g., one or more processors or one or more integrated circuits). In one example, the one or more processors execute a program that is stored in a non-transitory computer-readable medium.

Several fast-recoloring algorithms according to embodiments are proposed below. In embodiments, any combination of these fast-recoloring algorithms, or portions of these fast-recoloring algorithms can be used or applied.

Unidirectional Searching

In the current design of fast recoloring, two KD-trees are constructed, one for the source point cloud and one for the reconstructed point cloud. The KD-tree of the source point cloud is used in the forward search, while the KD-tree of the reconstructed point cloud is used in the backward search.

In embodiments, only the backward search is applied, therefore only the KD-tree of the reconstructed point cloud is constructed. An example of such a simplified recoloring algorithm could be as follows:

For each target point $p_r$:
1—Find the set of source points that $p_r$ belongs to their set of $N_2$ nearest neighbors. Denote this set of points by $\Psi_2$. It is the backward search as shown in FIG. 1.
2—Compute the distance-weighted average of points in $\Psi_2$ by:

$$\bar{\Psi}_2 = \frac{\sum_{q \in \Psi_2} \frac{c(q)}{\Delta(q, p_r)}}{\sum_{q \in \Psi_2} \frac{1}{\Delta(q, p_r)}} \quad \text{Equation (2)}$$

where $\Delta(a,b)$ denotes the Euclidian distance between the points a and b, and $c(q)$ denotes the color of point q.
3—Set $\bar{\Psi}_2$ as the color of the target point $p_r$.

In embodiments, only the forward search is applied, therefore only the KD-tree of the source point cloud is constructed. The simplified recoloring algorithm could be as follows:

For each target point $p_r$.
1—Find the $N_1$ ($1<N_1$) nearest neighbors in source to $p_r$ and create a set of points denoted by $\Psi_1$.
2—Compute the distance-weighted average of points in $\Psi_1$ by:

$$\bar{\Psi}_1 = \frac{\sum_{q \in \Psi_1} \frac{c(q)}{\Delta(q, p_r)}}{\sum_{q \in \Psi_1} \frac{1}{\Delta(q, p_r)}} \quad \text{Equation (3)}$$

where $\Delta(a,b)$ denotes the Euclidian distance between the points a and b, and $c(q)$ denotes the color of point q.
3—Set $\bar{\Psi}_1$ as the color of the target point $p_r$.

Simplified Weighted Averaging

In embodiments, the weighted average strategy can be simplified in many aspects. Note that any portion of the embodiments disclosed herein may be combined in any order.

For example, in embodiments, for the distance calculation of $\Delta(a,b)$ in $$\bar{\Psi}_k = \frac{\sum_{q \in \Psi_k} \frac{c(q)}{\Delta(q, p_r)}}{\sum_{q \in \Psi_k} \frac{1}{\Delta(q, p_r)}} \quad \text{Equation (4)}$$

any distance metrics (e.g., $l_1$ and $l_2$ distance) may be used in any coordinate system (e.g., in Cartesian and spherical coordinates).

In embodiments, the nearest neighbor may be used as the predictor directly.

In embodiments, the averaged value of the neighbors may be calculated as the predictor as follows:

$$\Psi_k = \frac{\sum_{q \in \Psi_k} c(q)}{N_1} \quad \text{Equation (5)}$$

which may be equivalent to set all weightings to a constant value, i.e., $\Delta(q,p_r)=K$.

In embodiments, integer multiplications, for example divisions, may be used instead of floating-point operations in calculating the weights. For example, let $$Q(a, b) = \left\lfloor \frac{(1 \ll M) + N}{\Delta(a, b)} \right\rfloor,$$

where M and N are integer constants, e.g., M=32, N=$\Delta$(a, b)>>1, $\lfloor \cdot \rfloor$ indicates an integer conversion, which could be floor or ceiling or round operation. Then, the weighted average can be derived as follows:

$$\Psi_k = \frac{\sum_{q \in \Psi_k} c(q) \cdot Q(q, p_r)}{\sum_{q \in \Psi_k} Q(q, p_r)} \quad \text{Equation (6)}$$

In this embodiment, if the denominator of the above equation equals to zero, i.e., $\Sigma_{q \in \Psi_k} Q(q,p_r)=0$, one can use other methods to tackle this special case. For example, one can simply calculate the average of the neighbors or take a nearest neighbor as the predictor.

In this embodiment, another integer parameter L may be defined to ensure the maximum number of $Q(q,p_r)$ for all $q \in \Psi_k$ is smaller than $2^L$. If there is a $Q(q,p_r)$ that is equal to or larger than $2^L$, all $Q(q,p_r)$ may be downscaled, for example by bitwise right shifting, until the maximum $Q(q, p_r)$ is smaller than $2^L$.

In embodiments, the distance-based weighting model can be modified by an arbitrary transform model, e.g., a linear model, a quadratic model, and other non-linear models. For example, the weighting can be as follows:

$$\frac{1}{A \cdot \Delta(q, p_r) + B} \quad \text{Equation (7)}$$

where A>0 and B>0 are positive constants. Based on this new model, if the integer conversion is applied, the conversion equation can be changed accordingly as follows:

$$Q(a, b) = \left\lfloor \frac{(1 \ll M) + N}{A \cdot \Delta(a, b) + B} \right\rfloor \quad \text{Equation (8)}$$

In embodiments, when the integer conversion is applied, look-up tables may be used to replace integer multiplication operations. In this case, look-up tables may be constructed to store precomputed results of all possible combinations of $c \cdot Q(a,b)$, i.e., $$LUT[c][Q(a,b)]=c \cdot Q(a,b) \quad \text{Equation (9)}$$

The averaged weighting can be then changed as follows, $$\Psi_k = \frac{\sum_{q \in \Psi_k} LUT[c(q)][Q(q, p_r)]}{\sum_{q \in \Psi_k} Q(q, p_r)} \quad \text{Equation (10)}$$

Search in KD-Tree of Voxelized Space

In embodiments, instead of constructing the KD-tree from the point clouds in original coordinates, the point clouds can first be voxelized, by subdividing the 3D space into smaller cubes, and the points in the same cube will be merged as a single point. Merging multiple points into one can be done in averaging their geometry and attribute values, where any weighting strategy such as the distance-based averaging can be applied. Then, the forward and backward searching processes can be done in the KD-tree of the voxelized point clouds.

Figure 7:
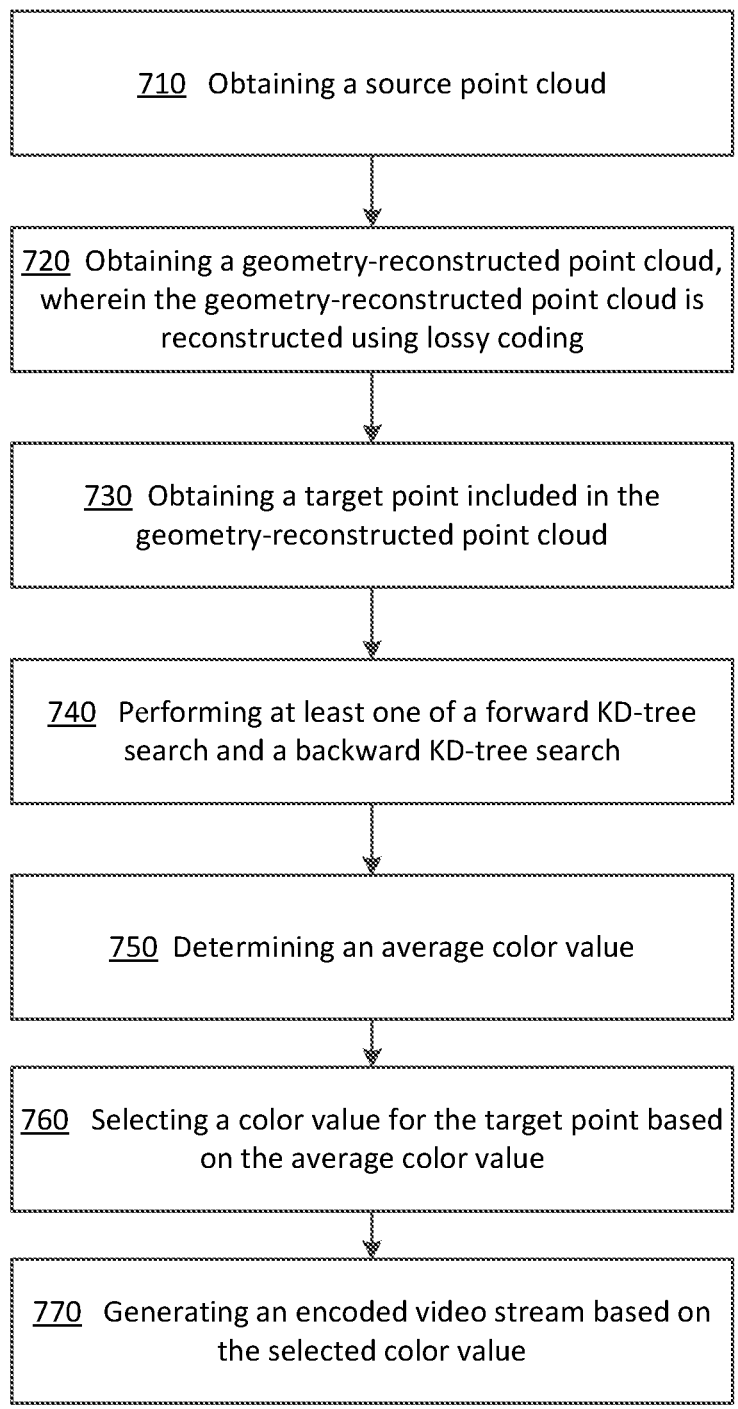
FIG. 7 is a flow diagram illustrating a process performed by an embodiment.

FIG. 7 is a flowchart of a method 700 of encoding a video stream using video point cloud coding. In some implementations, one or more process blocks of FIG. 7 may be performed by encoder 203. In some implementations, one or more process blocks of FIG. 7 may be performed by another device or a group of devices separate from or including the encoder 203, such as the decoder 210.

As shown in FIG. 7, in operation 710, the method 700 may include obtaining a source point cloud. In embodiments, the source point cloud may correspond to source point cloud 502 discussed above.

In operation 720, the method 700 may include obtaining a geometry-reconstructed point cloud, wherein the geometry-reconstructed point cloud is reconstructed using lossy coding. In embodiments, the geometry-reconstructed point cloud may correspond to reconstructed point cloud 504 discussed above.

In operation 730, the method 700 may include obtaining a target point included in the geometry-reconstructed point cloud. In embodiments, the target point may correspond to target point $p_r$ discussed above.

In operation 740, the method 700 may include performing at least one of a forward K-dimensional (KD)-tree search to determine a first plurality of points of the source point cloud which are nearest neighbors to the target point, and a backward KD-tree search to determine a second plurality of points of the source point cloud for which the target point is a nearest neighbor. In embodiments, the first average color value may correspond to $\Psi_1$ discussed above, and the second average color value may correspond to $\Psi_2$ discussed above.

In operation 750, the method 700 may include determining an average color value based on at least one of a first average color value of the first plurality of points and a second average color value of the second plurality of points.

In operation 760, the method 700 may include selecting a color value for the target point based on the average color value.

In operation 770, the method 700 may include generating an encoded video stream based on the selected color value.

In embodiments, the average color value may be determined based on the second average color value without using the first average color value.

In embodiments, the average color value may be determined based on the first average color value without using the second average color value.

In embodiments, the at least one of the first average color value and the second average color value may be determined using an integer conversion.

In embodiments, the at least one of the first average color value and the second average color value may be determined using at least one from among a linear model, a quadratic model, or a non-linear model.

In embodiments, the at least one of the first average color value and the second average color value may be determined based on at least one of a voxelized source point cloud and a voxelized geometry-reconstructed point cloud.

Although FIG. 7 shows example blocks of the method 700, in some implementations, the method 700 may include additional blocks, fewer blocks, different blocks, or differently arranged blocks than those depicted in FIG. 7 Additionally, or alternatively, two or more of the blocks of the method 700 may be performed in parallel.

Figure 8:
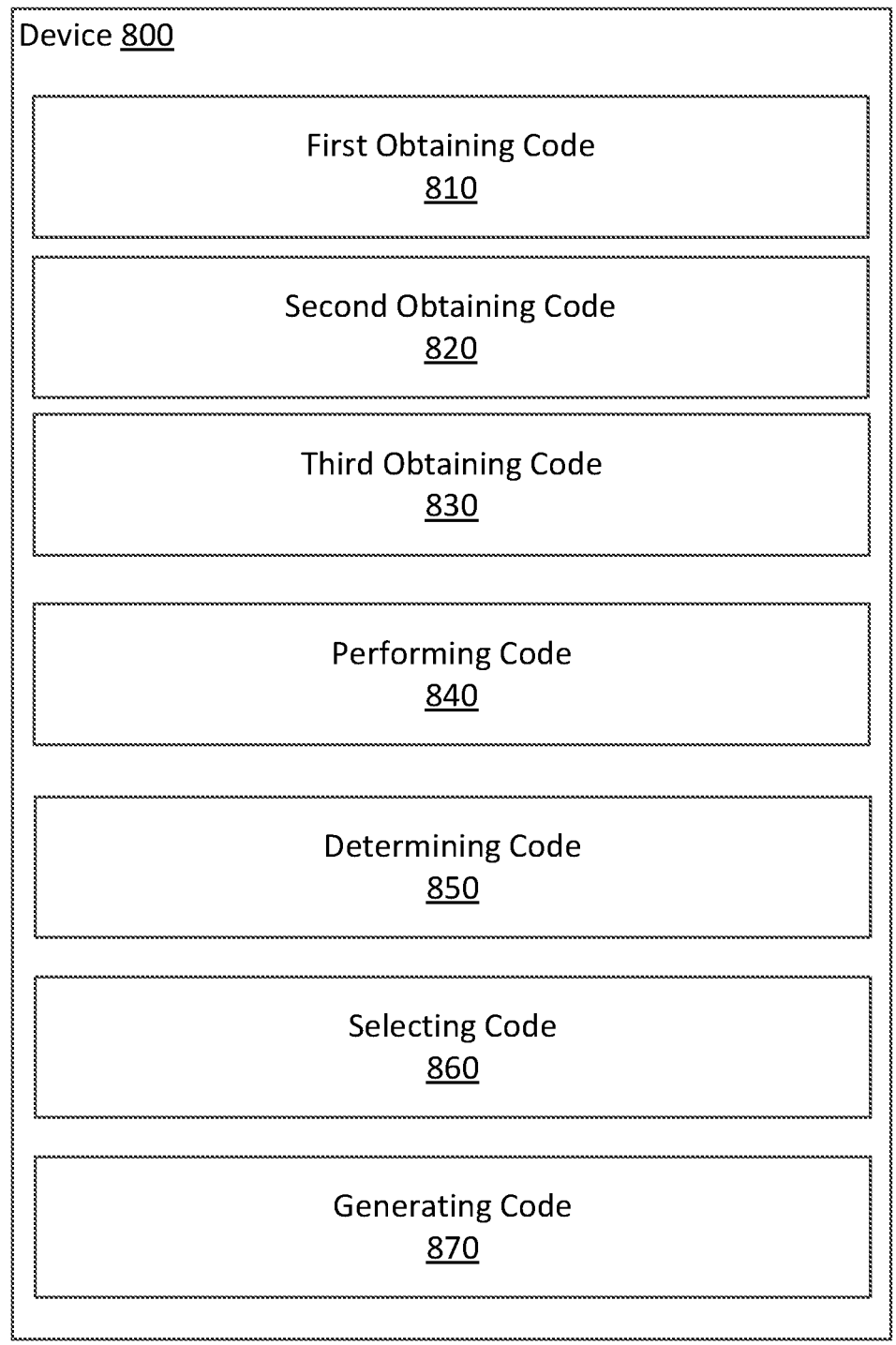
FIG. 8 is a diagram illustrating a device in accordance with an embodiment.

FIG. 8 is a diagram of an apparatus 800 for decoding a video stream encoded using video point cloud coding, according to embodiments. As shown in FIG. 8, the apparatus 800 includes first obtaining code 810, second obtaining code 820, third obtaining code 830, performing code 840, determining code 850, selecting code 860, and generating code 870.

The first obtaining code 810 may be configured to cause the at least one processor to obtain a source point cloud.

The second obtaining code 820 may be configured to cause the at least one processor to obtain a geometry-reconstructed point cloud, wherein the geometry-reconstructed point cloud is reconstructed using lossy coding.

The third obtaining code 830 may be configured to cause the at least one processor to obtain a target point included in the geometry-reconstructed point cloud.

The performing code 840 may be configured to cause the at least one processor to perform at least one of a forward K-dimensional (KD)-tree search to determine a first plurality of points of the source point cloud which are nearest neighbors to the target point, and a backward KD-tree search to determine a second plurality of points of the source point cloud for which the target point is a nearest neighbor.

The determining code 850 may be configured to cause the at least one processor to determine an average color value based on at least one of the first average color value and the second average color value.

The selecting code 860 may be configured to cause the at least one processor to select a color value for the target point based on the average color value.

The generating code 870 may be configured to cause the at least one processor to generate an encoded video stream based on the selected color value.

The techniques, described above, can be implemented as computer software using computer-readable instructions and physically stored in one or more computer-readable media. For example, FIG. 9 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
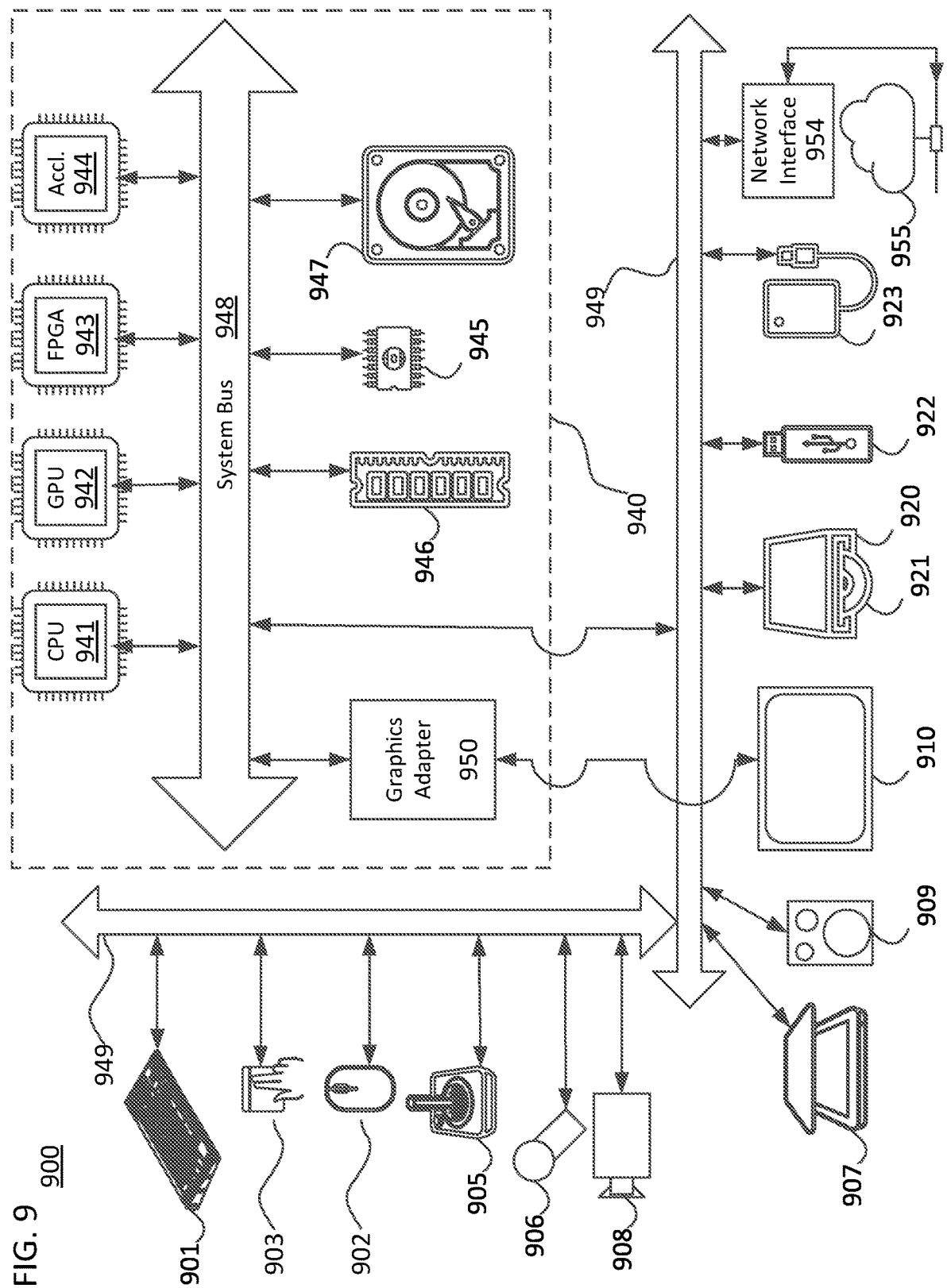
FIG. 9 is a diagram of a computer system suitable for implementing embodiments.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output, virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of encoding a video stream using video point cloud coding, the method being performed by at least one processor and comprising:
    obtaining a source point cloud;
    obtaining a geometry-reconstructed point cloud, wherein the geometry-reconstructed point cloud is reconstructed using lossy coding;
    obtaining a target point included in the geometry-reconstructed point cloud;
    performing a uni-directional search in which (i) a forward K-dimensional (KD)-tree search is performed to determine a first plurality of points of the source point cloud which are nearest neighbors to the target point and a backward KD-tree search is not performed, or (ii) the backward KD-tree search is performed to determine a second plurality of points of the source point cloud for which the target point is a nearest neighbor and the forward KD-tree search is not performed;
    determining an average color value based on a first average color value of the first plurality of points in response to the forward KD-tree search being performed, and a second average color value of the second plurality of points in response to the backward KD-tree search being performed, the first average color value determined based on a Euclidian distance between two points including a first point in the first plurality of points and a second point in the geometry-reconstructed point cloud, the second average color value determined based on a Euclidian distance between two points including a first point in the second plurality of points and the second point in the geometry-reconstructed point cloud;
    selecting a color value for the target point based on the average color value; and
    generating an encoded video stream based on the selected color value.

2. The method of claim 1, wherein the average color value is determined based on the second average color value without using the first average color value.

3. The method of claim 2, wherein the two points are q and $p_r$, wherein the second average color value is determined as follows:

$$\Psi_2 = \frac{\sum_{q \in \Psi_2} \frac{c(q)}{\Delta(q, p_r)}}{\sum_{q \in \Psi_2} \frac{1}{\Delta(q, p_r)}},$$

where $\Psi_2$ represents the second plurality of points, $\overline{\Psi}_2$ represents the second average color value, where $c(q)$ represents a color of point q included in the second plurality of points, and where $\Delta(q,p_r)$ represents the Euclidian distance between q and $p_r$.

4. The method of claim 1, wherein the average color value is determined based on the first average color value without using the second average color value.

5. The method of claim 4, wherein the two points are q and $p_r$, wherein the first average color value is determined as follows:

$$\Psi_1 = \frac{\sum_{q \in \Psi_1} \frac{c(q)}{\Delta(q, p_r)}}{\sum_{q \in \Psi_1} \frac{1}{\Delta(q, p_r)}},$$

where $\Psi_1$ represents the first plurality of points, $\overline{\Psi}_1$ represents the first average color value, where $c(q)$ represents a color of point q included in the first plurality of points, and where $\Delta(q,p_r)$ represents the Euclidian distance between q and $p_r$.

6. The method of claim 1, wherein the at least one of the first average color value and the second average color value is determined using an integer conversion.

7. The method of claim 1, wherein the at least one of the first average color value and the second average color value is determined using at least one from among a linear model, a quadratic model, or a non-linear model.

8. The method of claim 1, wherein the at least one of the first average color value and the second average color value is determined based on at least one of a voxelized source point cloud and a voxelized geometry-reconstructed point cloud.

9. An apparatus for encoding a video stream using video point cloud coding, the apparatus comprising:
at least one memory configured to store program code; and
at least one processor configured to read the program code and operate as instructed by the program code, the program code comprising:
first obtaining code configured to cause the at least one processor to obtain a source point cloud;
second obtaining code configured to cause the at least one processor to obtain a geometry-reconstructed point cloud, wherein the geometry-reconstructed point cloud is reconstructed using lossy coding;
third obtaining code configured to cause the at least one processor to obtain a target point included in the geometry-reconstructed point cloud;
performing code configured to cause the at least one processor to perform a uni-directional search in which (i), a forward K-dimensional (KD)-tree search is performed to determine a first plurality of points of the source point cloud which are nearest neighbors to the target point and a backward KD-tree search is not performed or (ii) the backward KD-tree search is performed to determine a second plurality of points of the source point cloud for which the target point is a nearest neighbor and the forward KD-tree search is not performed;
determining code configured to cause the at least one processor to determine an average color value based on a first average color value in response to the forward KD-tree search being performed, and a second average color value in response to the backward KD-tree search being performed, the first average color value determined based on a Euclidian distance between two points including a first point in the first plurality of points and a second point in the geometry-reconstructed point cloud, the second average color value determined based on a Euclidian distance between two points including a first point in the second plurality of points and the second point in the geometry-reconstructed point cloud;
selecting code configured to cause the at least one processor to select a color value for the target point based on the average color value; and
generating code configured to cause the at least one processor to generate an encoded video stream based on the selected color value.

10. The apparatus of claim 9, wherein the average color value is determined based on the second average color value without using the first average color value.

11. The apparatus of claim 10, wherein the two points are q and $p_r$, wherein the second average color value is determined as follows:

$$\Psi_2 = \frac{\sum_{q \in \Psi_2} \frac{c(q)}{\Delta(q, p_r)}}{\sum_{q \in \Psi_2} \frac{1}{\Delta(q, p_r)}},$$

where $\Psi_2$ represents the second plurality of points, $\overline{\Psi}_2$ represents the second average color value, where $c(q)$ represents a color of point q included in the second plurality of points, and where $\Delta(q,p_r)$ represents the Euclidian distance between q and $p_r$.

12. The apparatus of claim 9, wherein the average color value is determined based on the first average color value without using the second average color value.

13. The apparatus of claim 12, wherein the two points are q and $p_r$, wherein the first average color value is determined as follows:

$$\Psi_1 = \frac{\sum_{q \in \Psi_1} \frac{c(q)}{\Delta(q, p_r)}}{\sum_{q \in \Psi_1} \frac{1}{\Delta(q, p_r)}},$$

where $\Psi_1$ represents the first plurality of points, $\overline{\Psi}_1$ represents the first average color value, where $c(q)$ represents a color of point q included in the first plurality of points, and where $\Delta(q,p_r)$ represents the Euclidian distance between q and $p_r$.

14. The apparatus of claim 9, wherein the at least one of the first average color value and the second average color value is determined using an integer conversion.

15. The apparatus of claim 9, wherein the at least one of the first average color value and the second average color value is determined using at least one from among a linear model, a quadratic model, or a non-linear model.

16. The apparatus of claim 9, wherein the at least one of the first average color value and the second average color value is determined based on at least one of a voxelized source point cloud and a voxelized geometry-reconstructed point cloud.

17. A non-transitory computer-readable medium storing computer instructions for encoding a video stream using video point cloud coding that, when executed by at least one processor, cause the at least one processor to:
   obtain a source point cloud;
   obtain a geometry-reconstructed point cloud, wherein the geometry-reconstructed point cloud is reconstructed using lossy coding;
   obtain a target point included in the geometry-reconstructed point cloud;
   perform a uni-directional search in which (1) a forward K-dimensional (KD)-tree search is performed to determine a first plurality of points of the source point cloud which are nearest neighbors to the target point and a backward KD-tree search is not performed, or (ii) the backward KD-tree search is performed to determine a second plurality of points of the source point cloud for which the target point is a nearest neighbor and the forward KD-tree search is not performed;
   determine an average color value based on a first average color value of the first plurality of points in response to the forward KD-tree search being performed and a second average color value of the second plurality of points in response to the backward KD-tree search being performed, the first average color value determined based on a Euclidian distance between two points including a first point in the first plurality of points and a second point in the geometry-reconstructed point cloud, the second average color value determined based on a Euclidian distance between two points including a first point in the second plurality of points and the second point in the geometry-reconstructed point cloud;
   select a color value for the target point based on the average color value; and
   generate an encoded video stream based on the selected color value.

18. The non-transitory computer-readable medium of claim 17, wherein the average color value is determined based on only one of the first average color value or the second average color value.

19. The non-transitory computer-readable medium of claim 17, wherein the at least one of the first average color value and the second average color value is determined using at least one of an integer conversion, a linear model, a quadratic model, or a non-linear model.

20. The non-transitory computer-readable medium of claim 17, wherein the at least one of the first average color value and the second average color value is determined based on at least one of a voxelized source point cloud and a voxelized geometry-reconstructed point cloud.

* * * * *